United States Patent

Speers

[15] 3,652,123
[45] Mar. 28, 1972

[54] VEHICLE BED LINER
[72] Inventor: James R. Speers, Erie, Pa.
[73] Assignee: Continental Rubber Works, Erie, Pa.
[22] Filed: Jan. 8, 1970
[21] Appl. No.: 1,363

[52] U.S. Cl. .............................. 296/28 D, 52/177, 296/39 R
[51] Int. Cl. ............................................................. B62h 33/04
[58] Field of Search ............... 296/28 D, 28 M, 39 R, 41, 31; 52/177; 94/5; 220/63; 105/422

[56] References Cited

UNITED STATES PATENTS

| | | | |
|---|---|---|---|
| 2,746,637 | 5/1956 | Todd et al. | 220/63 |
| 2,221,038 | 11/1940 | Austin | 94/5 X |
| 3,363,933 | 1/1968 | Wilson | 105/422 X |
| 1,082,584 | 12/1913 | Clippinger | 296/41 |

Primary Examiner—Kenneth H. Betts
Assistant Examiner—John A. Pekar
Attorney—Charles L. Lovercheck

[57] ABSTRACT

This specification discloses a truck bed liner made of planks of rubber bonded to metal plates. The planks may be, for example, 12 inches wide and two inches thick, and run the length of the bed. Threaded bolts extend through the metal plates by which the planks may be attached to the floor of the truck bed.

3 Claims, 3 Drawing Figures

Inventor
JAMES R. SPEERS
By
Charles L. Lovercheck  Attorney

VEHICLE BED LINER

STATEMENT OF INVENTION

This invention relates to vehicle bodies and, more particularly, to a liner for truck beds.

OBJECTS OF THE INVENTION

It is an object of the invention to provide an improved truck bed liner.

Another object of the invention is to provide a truck bed liner which is simple in construction, economical to manufacture, and simple and efficient to use.

Another object of the invention is to provide a rubber plank supported on sheet metal backing which may be bolted in place to a truck bed bottom.

DETAILED DESCRIPTION OF THE DRAWINGS

Figure 1:
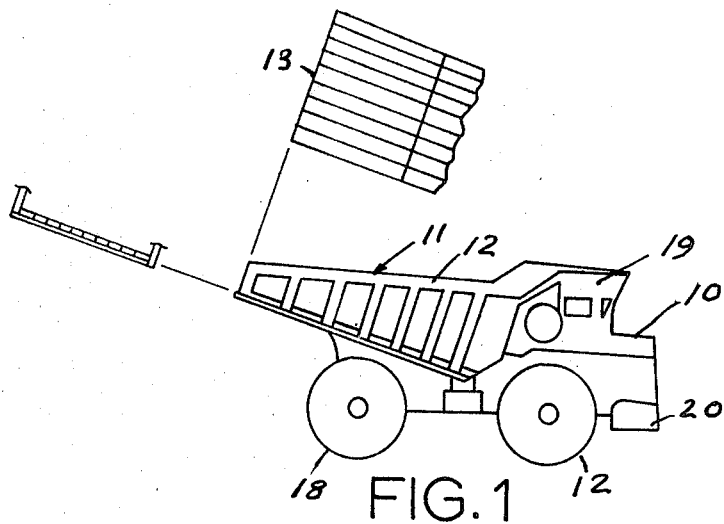
FIG. 1 is a side view of a truck of the type contemplated in this invention.
Figure 2:
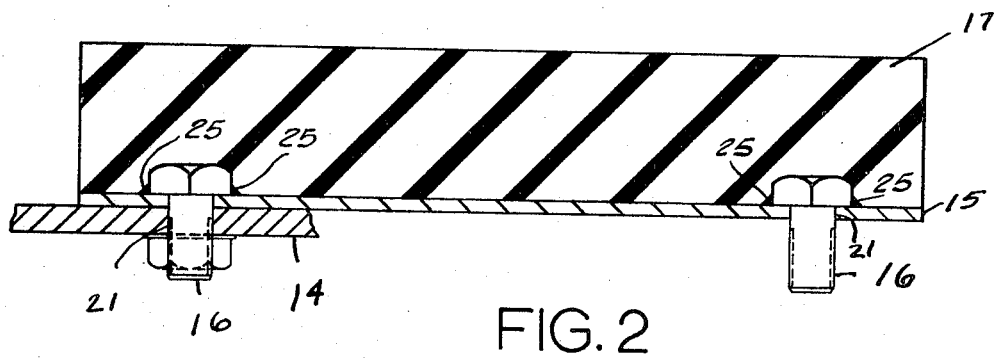
FIG. 2 is a cross sectional view taken on line 2—2 of FIG. 1.
Figure 3:
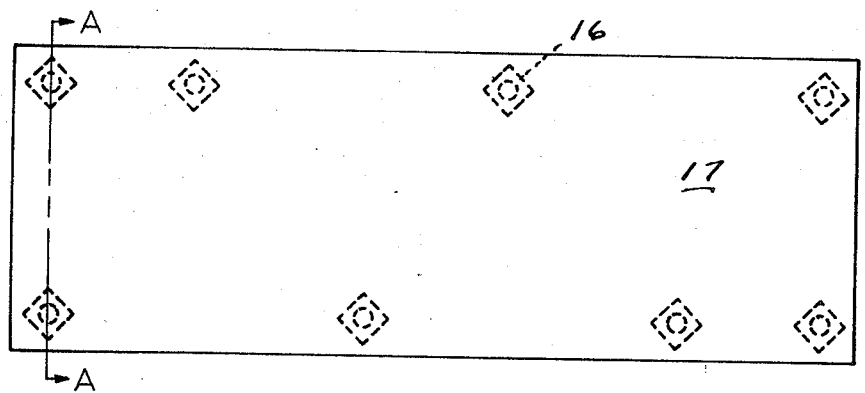
FIG. 3 is a top view of one of the planks.

The drawings show a truck 10 having wheels 12 and 18, cab 19 and bumper 20. The truck has body 11 which is a conventional dump truck type bed that is commonly used for road construction for hauling stones, concrete, or other heavy materials that are inclined to damage the bottom of the truck bed.

The bottom and front end of the truck bed are covered or lined with planks made of rubber. The rubber planks are supported between the sides 12 and the ends 13 of the truck on the bottom 14 and front end. The bottom slopes forward at an angle of, for example, 30°. The rubber planks are bonded to metal sheets 15 which may be one-eighth inches thick, for example, twelve inches wide and run the full length of the truck bed. The threaded bolts 16 extend through holes 21 in the sheets and have their heads embedded in the rubber sheet 17. The heads of the bolts are secured at 25 to the plate 15. The rubber may be of any desired consistency; for example, it can be a hard rubber or a rubber that is resistant to abrasion. The heads of bolts 16 are bonded to rubber 17. The rubber planks may cover the bottom, ends and sides of the truck bed.

The foregoing specification sets forth the invention in its preferred practical forms but the structure shown is capable of modification within a range of equivalents without departing from the invention which is to be understood is broadly novel as is commensurate with the appended claims.

I claim:

1. A truck body and a liner therefor,
said truck body having sides, an end and a bottom,
and a resilient cover for said bottom,
said cover comprising sheets of metal having headed, threaded bolts extending therethrough,
said bolts extending through said sheets and said heads resting on said sheets and nuts on said bolts,
said heads being secured to said sheets,
and relatively thick planks of rubber bonded to said metal sheets and to said bolt heads,
said planks being approximately 12 inches wide and extending the full length of the truck bed.

2. The truck bed liner recited in claim 1 wherein the thickness of said rubber is between one-fourth inches and 4 inches in thickness.

3. The truck bed and liner recited in claim 1 wherein said bottom slopes forward at an angle of approximately 30° to the horizontal.

* * * * *